Patented Sept. 11, 1928.

1,683,835

UNITED STATES PATENT OFFICE.

AUGUSTUS E. MAZE, OF ORANGE, NEW JERSEY.

RESINOUS COMPOSITION OF MATTER AND PROCESS OF MAKING SAME.

No Drawing.   Application filed September 14, 1926.   Serial No. 135,487.

The object of this invention is the production of a resinous material suitable for use in lacquers and the like. This resinous material is produced by the interaction of diacetone alcohol and formaldehyde in the presence of a suitable catalyst.

The reaction may be carried out in either of two ways. (1) One molecular equivalent of diacetone alcohol may be mixed with three molecular equivalents of formaldehyde. The usual 40% commercial aqueous solution is suitable but other concentrations may be employed. To this mixture is added one one-hundredth of a molecular equivalent of a water soluble basic metal compound which in one one-hundredth normal aqueous solution produces a hydrogen ion concentration having a pH value of more than 7.1. For this purpose an hydroxide of one of the alkali or alkaline earth metals or a soluble carbonate or phosphate may be employed. Upon addition of the catalyst a vigorous reaction ensues. During this reaction the mixture may be held in a pressure vessel or in a vessel equipped for rapid cooling and reflux condensation. The product is a pale yellow resinous mass. (2) One molecular equivalent of diacetone alcohol is mixed with one one-hundredth of a molecular equivalent of the above named catalyst. This mixture is placed in a vessel equipped with means for cooling and reflux condensation. The three molecular equivalents of formaldehyde as above described are run into the diacetone alcohol. The product obtained is identical with that obtained by the first method.

For illustration of the process the following example is given. To 1160 grams of diacetone alcohol are added 0.4 grams of sodium hydroxide dissolved in 10 cc. of water. This mixture is placed in a flask surrounded by a cooling bath and equipped with a reflux condenser. Into this mixture is run slowly 2250 grams of 40% aqueous solution of formaldehyde. The temperature rises rapidly. The mass is then removed from the flask.

A resinous mass separates and the supernatant aqueous layer is removed. The resinous mass is heated to expel the water and fuse the mass. This resin is soluble in esters, and ketones.

Having thus described the invention what I claim is:

The resinous body formed by the interaction of one molecule of diacetone alcohol and three molecules of formaldehyde in the presence of an alkali.

AUGUSTUS E. MAZE.